Aug. 3, 1971  E. M. SMITH  3,597,517
METHOD OF MAKING PLASTIC BELLOWS
Filed June 9, 1970  2 Sheets-Sheet 1
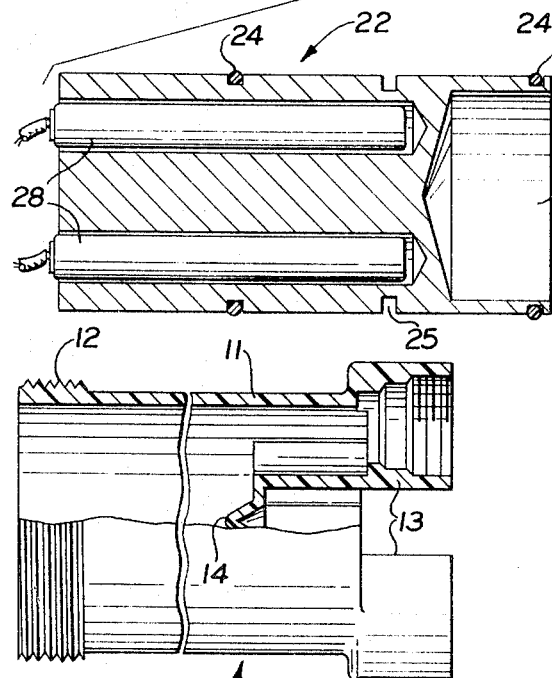
FIG. 1
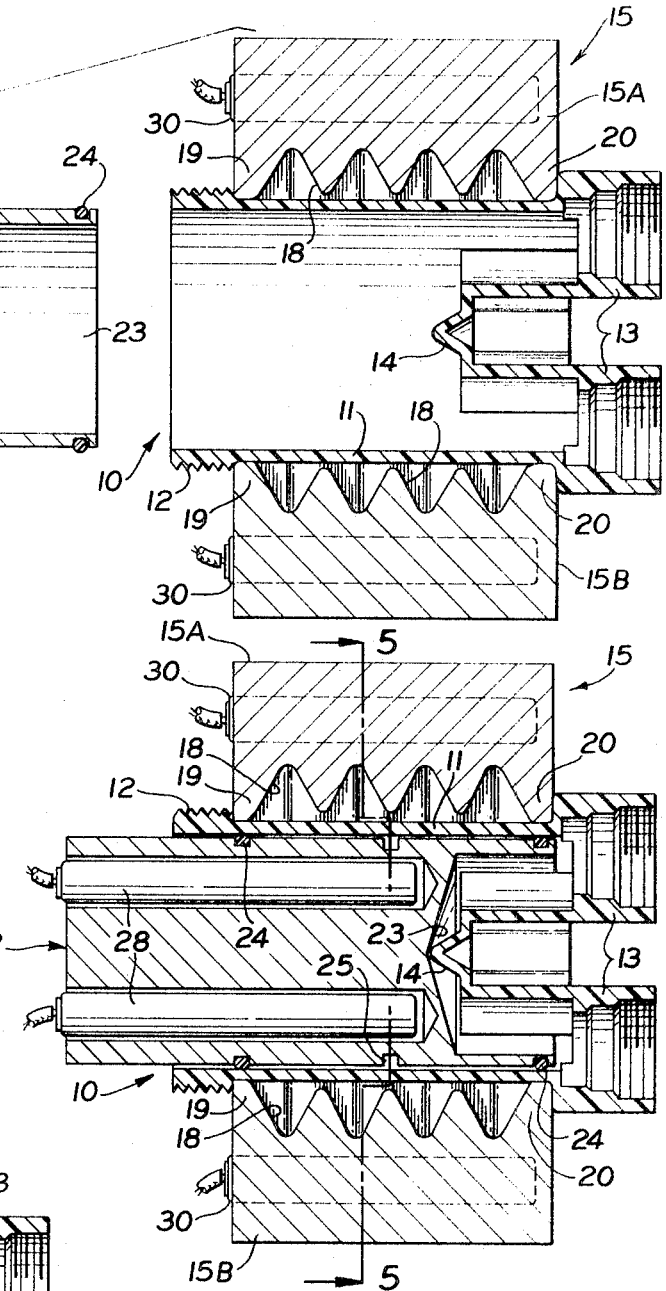
FIG. 2
FIG. 3
FIG. 4
INVENTOR.
EDWARD M. SMITH
BY Hamilton, Cook,
Renner & Kenner
ATTORNEYS

INVENTOR.
EDWARD M. SMITH

United States Patent Office 3,597,517
Patented Aug. 3, 1971

3,597,517
METHOD OF MAKING PLASTIC BELLOWS
Edward M. Smith, Mansfield, Ohio, assignor to
The Gorman-Rupp Company, Mansfield, Ohio
Continuation-in-part of application Ser. No. 793,368,
Jan. 23, 1969. This application June 9, 1970, Ser.
No. 44,801
Int. Cl. B29c 17/07
U.S. Cl. 264—97
17 Claims

ABSTRACT OF THE DISCLOSURE

A method of forming a cylindrical bellows out of substantially inelastic plastic material of the polypropylene type by first injection molding a substantially cylindrical tube having certain required end configurations and then, while maintaining the tube at a softening temperature substantially below its melting temperature, applying high fluid pressure within the tube to stretch-mold convolutions and effect molecular orientation therein producing long-lived axial flexibility with minimal radial variation.

CROSS-REFERENCE TO RELATED APPLICATION

This application is a continuation-in-part of my copending application Ser. No. 793,368, filed Jan. 23, 1969 and now abandoned.

BACKGROUND OF THE INVENTION

A bellows used as an accurate pumping element in a metering pump, for example, should be substantially rigid in a radial direction and easily flexible in an axial direction. Certain plastic materials, such as polymers of propylene and related materials, have these properties, together with the capability of being fatigue-resistant over extremely long periods of flexing when the hinge or flexing portions are stretch-formed in a solid state to orient the molecules therein. This long-lived flexing characteristic is commonly known as a "living hinge."

Such plastic materials are particularly desirable in the pumping of chemicals and corrosive materials, and in pumping beverage syrups used in dispensing soft drinks, because the plastic is not effected by the material being pumped and the usual piston seals are eliminated. One form of pump utilizing such a plastic bellows is shown in my copending application Ser. No. 765,319, filed Oct. 7, 1968.

A bellows formed of propylene type materials by conventional injection molding or blow molding does not have the desired long-lived flexing property because it is formed in a liquid or molten state rather than a solid state.

It has been proposed to extrude a tube of the plastic material and then blow mold it while heated into the bellows shape. There are several objections to this proposal. Conventional blow molding does not produce the desired long-life flexing property. The bellows portion of the tube should have a different thickness than the end portions, which requires machining the extruded tube. Attempts to extrude a tube of varying thickness by varying the extrusion temperature, and slowing down the extrusion rate, were not successful. Further, the end portions of the bellows are normally provided with irregular configurations and projections for valving connections, and these must be made separately and then welded or otherwise adhered to the ends of the bellows.

SUMMARY OF THE INVENTION

It is a primary object of the invention to provide a method of forming a plastic bellows having substantial radial rigidity and long-lived axial flexibility without requiring machining or the attachment of separately formed parts.

Another object is to provide a method of injection molding a plastic tube and then hot-stretching to form a bellows therein having the desired characteristics.

These and other objects are accomplished by injection molding a tube of plastic material of the polypropylene type having required end configurations, using annular gating at one end of the mold and maintaining the mold at a predetermined temperature to insure peripheral uniformity of wall thickness, and then stretch-forming the bellows portion of the tube at a softening or flow temperature substantially below melting by blowing air therein at relatively high pressures as compared with conventional blow molding, to obtain bellows walls of varying thickness permitting axial flexing during expansion and contraction with substantially no radial movement.

BRIEF DESCRIPTION OF THE DRAWINGS

FIG. 1 is a sectional view, partly in elevation, of an injection-formed tube of plastic material having required irregular end configurations for conduit and valving connections.

FIG. 2 is an exploded sectional view showing the tube of FIG. 1 positioned within an annular mold, and an adjacent heating core in position to be inserted into the tube.

FIG. 3 is a similar view showing the core inserted.

FIG. 4 is a similar view showing the tube expanded into the annular mold cavity.

DESCRIPTION OF A PREFERRED EMBODIMENT

Figure 5:
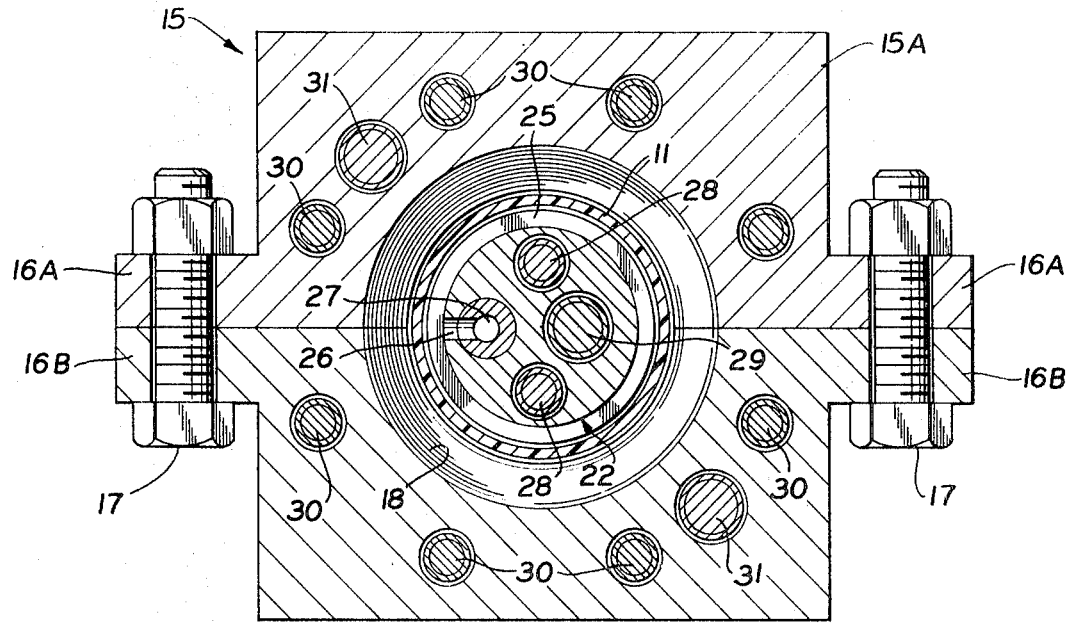
FIG. 5 is a transverse sectional view on line 5—5 of FIG. 3.

The injection-formed cylindrical tube shown generally at 10 in FIG. 1 has a cylindrical portion 11 having a threaded portion 12 on one end and two diametrically opposed cylindrical projections 13 on the opposite end which are internally threaded to provide conduit or valve connections. Between the projections 13 is a reentrant axial portion which provides an interior conical projection 14 on the tube axis.

A preferred material comprises certain copolymers of propylene and ethylene sold by Eastman Chemical Products, Inc., of Kingsport, Tenn., as Tenite polyallomers, Tenite being the trade name for the material, and the term "polyallomer" being coined to identify such copolymers made by a special polymerization process. One of these Tenite polyallomers which has given satisfactory results is No. 5321, and another is No. M2050-32AE.

The No. 5321 material has an injection molding melt temperature of 380°–430° F., a density of 0.896 and a flow rate of 2 grams per 10 minutes. The No. 2050–32AE material has an injection molding melt temperature of 310°–430° F., a density of 0.900 and a flow rate of 3.7 grams per 10 minutes. I have found both of these materials in actual practice to be fairly rigid yet flexible enough to be formed into a bellows with a controlled diameter which will expand and contract axially with minimal radial movement. Also, a bellows of either of these materials, when properly formed in a solid state, has flexing or hinge properties of longer life than one of polypropylene.

In the injection molding operation, the No. 5321 material is preferably molded at a temperature of about 480° F. and the 2050–32AE material at a temperature of about 560° F. The injection molding cavity pressure may be about 8,000–14,000 p.s.i., although this pressure may vary depending upon the size and type of injection molding machine used. With both materials the mold is preferably annularly gated at the large open end of the tube 10 so as to insure peripheral uniformity of the tube wall as the material flows along the tube toward the opposite end. A molding temperature of 480°–560° F., substantially above the melting temperature of the material, is required, as a temperature such as 400° F., within the melting range of the material, results in weakened areas at the parting line. Also, the temperature of the mold is maintained at about 200° F. rather than at the temperature of about 70°–100° F. used in conventional injection molding.

Obviously, other related materials may produce satisfactory results. With other materials of the polypropylene or polypropylene-polyethylene type, the mold temperature may vary somewhat, but it should always be hot enough to prevent rapid cooling of the material, and yet cool enough to obtain a reasonably fast molding cycle.

While dimensions may vary considerably, the wall 11 of the tube may, for example, have an outer diameter of 1¾" and a thickness of about .050". In order to obtain a bellows which will compress and expand axially with substantially no radial movement, the material should bend but not stretch, so that the amount of fluid pumped by flexing the bellows is accurately metered, and I have discovered that the wall thickness of the convolutions should be varied to make the connecting walls of the convolutions thicker than the walls at the outer diameter of the convolutions. I have also discovered that variations in the wall thicknesses of the convolutions can be controlled within certain limits by lubricating the outer surface of the tube or the inner surface of the mold therefor during the blowing operation.

The optimum cross-sectional thicknesses of the bellows convolutions is such that at their outer diameter the convolutions flex or roll slightly to avoid a snap action of the bellows as it is compressed, and at their inner diameters the convolutions will flex readily without overstressing, while at the same time the walls between the outer and inner diameters are thick enough to prevent radial expansion and contraction. In order to stretch the material of wall 11 into a bellows shape with proper molecular orientation in the bellows to produce the long flexing life in the convolutions in the tube, I have discovered that the tube should be hot-formed by blow molding at temperatures and pressures substantially different from those used in the conventional blow molding of similar plastic materials. Thus, whereas this Tenite material would be conventionally blow molded at or approaching its melting temperature, for example 350–380° F., and at about 50 p.s.i., according to my present process the tube is heated to a much lower temperature of about 250–290° F. and formed by blowing at a much higher pressure of about 400 p.s.i.

Referring to FIGS. 2–5, the mold indicated generally at 15 has two mating halves 15a and 15b each having ears 16a and 16b, respectively, secured together by bolts 17. The mold halves have mating semicircular cavities provided with annular convolutions 18 which may be of triangular cross section for forming the convolutions of the bellows. Obviously, the form of the convolutions may vary. The annular ribs 19 and 20 at the opposite ends of the convolutions 18 of the mold are shaped to conform closely to the shoulders formed between the tube wall 11 and the ring 12 and the projections 13, respectively, when the tube 10 is placed within the mold halves 15a and 15b, as shown in FIGS. 2 and 3.

A cylindrical heating core 22 is provided to fit slidably within the tube 10, and the core has a circular recess 23 in one end to receive the interior conical projection 14 of the tube. O-rings 24 are carried in annular grooves around the outer periphery of the core 22 and are positioned so that they provide seals with the inner wall of the tube located under the annular ribs 18 and 20 of the mold, there being an annular space between the inner circumference of the tube and the outer circumference of the core.

Medially of the O-rings 24 an annular groove 25 is provided in the core and, as seen in FIG. 5, a radial port 26 connects the groove 25 to a longitudinal passageway 27 extending out through the end of the core opposite to the recess 23 for connection to a compressed air supply (not shown). The core also has longitudinal bores for housing electrical heating elements 28, and a thermostatic element 29 for controlling the temperature of the core in a usual manner. As shown in FIG. 5, the mold halves 15a and 15b also have heating elements 30 similar to elements 28 in the core and thermostatic elements 31 similar to core element 29.

With the core 22 assembled in the mold 15, as shown in FIGS. 3 and 5, the core and mold are heated by the electric heating elements to the desired temperature of, for example about 250–290° F. in the core and about 180–230° F. in the mold for the Tenite material, and the tube is soaked at those temperatures for about three minutes. Then, compressed air at about 400 p.s.i. is introduced into the passageway 27 and held for about one minute to expand the tube wall into the mold convolutions 18. The pressure is then shut off, the mold opened and the formed tube removed.

I have discovered that if the interface between the mold and the tube, that is, either inner surfaces 18 of the mold or the outer surface of wall 11 of the tube, are lubricated before the blow molding operation, the wall thicknesses are controllably varied to produce a much softer bellows action, while at the same time increasing the potential flex life of the bellows. For example, a silicone lubricant such as normally used as a mold release agent may be used to good advantage. I have found in actual practice that by using such a lubricant on the interface a bellows tube may be molded having substantially equal cross sectional thicknesses at the roots or minor diameters and at the crests or major diameters of the convolutions, while the thicknesses of the intermediate portions are substantially greater, whereas, if no lubricant is used, the cross-sectional thickness at the roots is substantially greater than at the crests, with the intermediate wall thicknesses tapering gradually from the roots to the crests.

Figure 6:
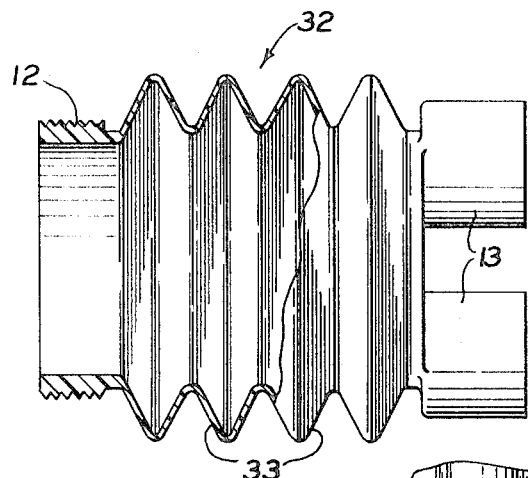
FIG. 6 is a sectional view, partly in elevation, of the molded tubular bellows.
Figure 7:
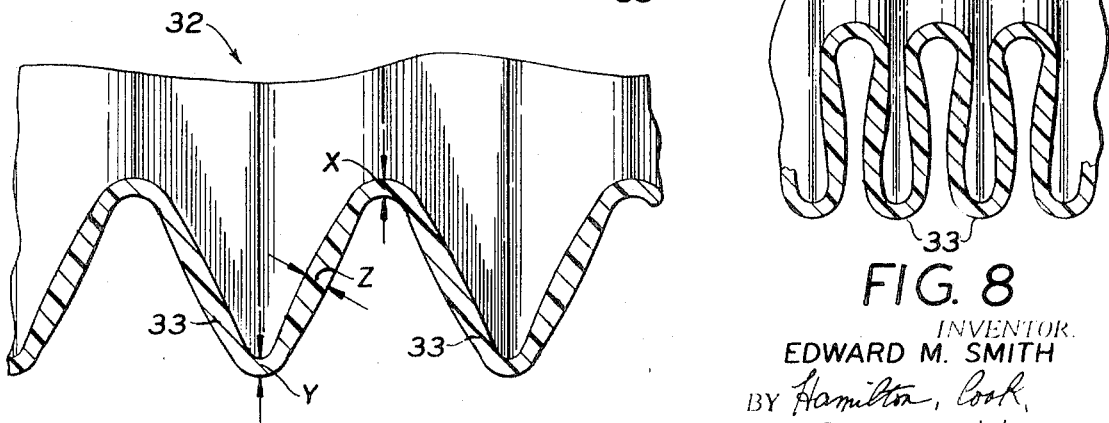
FIG. 7 is an enlarged partial sectional view of one wall of the tubular bellows in expanded position.

Accordingly, starting with the exemplary tube 10 having an outer diameter of 1¾" and a wall 11 having a thickness of about .050", lubricating the interface between the mold and tube, and then blowing in the manner previously described, a molding tube 32 such as in FIGS. 4 and 6 is obtained. Referring to FIG. 7, the outer diameter of the molded convolutions 33 is about 2½", the cross-sectional thickness X at the roots or minor diameter about .022", the cross-sectional thickness Y at the crests or major diameters about .018", and the cross-sectional thickness Z of the intermediate walls about .037": Thus a softer bellows with increased flex life is produced by using the lubricant. Changing the degree of lubricity of the interface produces slight variations in the wall thicknesses.

Figure 8:
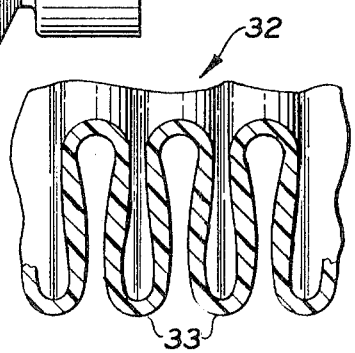
FIG. 8 is a similar view showing the bellows wall in collapsed position.

As indicated in FIG. 8, when the convolutions 33 are fully compressed, the relatively thin inner and outer ribs and intermediate sections bend into curved portions which allow compression without material radial movement, thus providing a bellows which maintains a substantially constant diameter suitable for a metering pump among various uses.

By molding the tube 32 in this manner at the specified temperatures and pressure, I obtain the desired molecular orientation in the convolutions to give extremely long flexing life, and also obtain the desired varying cross-sectional thicknesses of the convolutions to maintain a substantially constant diameter of the bellows as it expands and contracts axially. Keeping the mold temperature at about 50°–100° F. below the temperature of the core prevents elastic spring-back in the convolutions when the pressure is relieved. Materials of this type have the property of tending to return to their original shape if the mold temperature is too high.

It is also very important to maintain the core temperature at not over about 250°–290° F. for these Tenite materials so as to be substantially below the melting temperature range of the material. For example, a substantial increase in the core temperature tends to cause thin spots in the convolutions.

An improved method has been provided of forming a plastic bellows having substantial radial rigidity and long-life axial flexibility without requiring machining or or the attachment of separately formed parts.

I claim:

1. The method of making a bellows from polypropylene type material having an injection molding melt temperature of about 380°–430° F., comprising, injection molding a substantially cylindrical tube of the material at a temperature of at least about 480° F., lubricating the interface between the tube and the mold surface, and then stretch-forming said tube into cylindrical convolutions by heating the tube within a mold to a temeprature substantially below the melting temperature of the material and introducing therein internal fluid at a pressure of about 400 p.s.i. to control molecular orientation in the convolutions for producing long-life axial flexibility thereof with the convolutions having a cross-sectional thickness between their major and minor diameters substantially greater than the cross-sectional thickness at their major and minor diameters.

2. The method of claim 1, in which the injection molding temperature employed is about 480°–560° F.

3. The method of claim 1, in which the mold temperautre is maintained at about 200° F. during the injection molding of the tube.

4. The method of claim 1, in which the temperature of the mold during stretch-forming is maintained sufficiently below the material temperature to prevent elastic spring-back of the material when the forming pressure is relieved.

5. The method of claim 1, in which the material is a copolymer of propylene and ethylene.

6. The method of claim 1, in which the temperature of the material during stretch-forming is maintained sufficiently below its melting temperature to effect the molecular orientation required throughout the bellows convolutions to produce maximum flex life.

7. The method of claim 1, in which the cross-sectional thickness of the convolutions is substantially the same at their minor and major diameters.

8. The method of claim 1, in which the tube is heated to a temperature of about 250° F.–290° F. during the stretch-forming step.

9. The method of claim 8, in which the cross-sectional thickness of the convolutions is substantially the same as their minor and major diameters.

10. The method of making a bellows from polypropylene type material having an injection molding melt temperature of about 310°–430° F., comprising, injection molding a substantially cylindrical tube of the material at a temperature of at least about 480° F., lubricating the interface between the tube and the mold surface, and then stretch-forming said tube into cylindrical convolutions by heating the tube within a mold to a temperature substantially below the melting temperature of the material and introducing therein internal fluid at a pressure of about 400 p.s.i. to control molecular orientation in the convolutions for producing long-life axial flexibility thereof with the convolutions having a cross-sectional thickness between their major and minor diameters substantially greater than the cross-sectional thickness at their major and minor diameters.

11. The method of claim 10, in which the injection molding temperature employed is about 480°–560° F.

12. The method of claim 10, in which the mold temperature is maintained at about 200° F. during the injection molding of the tube.

13. The method of claim 10, in which the temperature of the mold during stretch-forming is maintained sufficiently below the material temperature to prevent elastic spring-back of the material when the forming pressure is relieved.

14. The method of claim 10, in which the material is a copolymer of propylene and ethylene.

15. The method of claim 10, in which the cross-sectional thickness of the convolutions is substantially the same at their minor and major diameters.

16. The method of claim 10, in which the tube is heated to a temperature of about 250°–290° F. during the stretch-forming step.

17. The method of claim 16, in which the cross-sectional thickness of the convolutions is substantially the same at their minor and major diameters.

References Cited

UNITED STATES PATENTS

| | | | |
|---|---|---|---|
| 3,313,319 | 4/1967 | Osborn et al. | 264—94X |
| 3,319,532 | 5/1967 | Pridham, Jr. | 92—34 |
| 3,337,666 | 8/1967 | Wilkins | 264—97 |

OTHER REFERENCES

Injection Molders Supply Co.; Silicone Spray, mold release advertisement; copy in Class 264/338; (9–54).

ROBERT F. WHITE, Primary Examiner

T. J. CARVIS, Assistant Examiner

U.S. Cl. X.R.

18—5; 138—121; 264—338